United States Patent [19]
Easton

[11] 4,033,466
[45] July 5, 1977

[54] GRAIN DRYING AND STORAGE APPARATUS

[76] Inventor: Harlan J. Easton, Box 607 - Rte. 3, Blooming Prairie, Minn. 55917

[22] Filed: July 12, 1976

[21] Appl. No.: 704,126

[52] U.S. Cl. .......................................... 214/17 CB
[51] Int. Cl.[2] .................................. B65G 65/32
[58] Field of Search ...... 214/17 CA, 17 CB, 17 DB

[56] References Cited
UNITED STATES PATENTS

| | | | |
|---|---|---|---|
| 3,526,328 | 9/1970 | Garret et al. | 214/17 CB |
| 3,794,190 | 2/1974 | Lambert | 214/17 CB X |

*Primary Examiner*—Robert G. Sheridan
*Attorney, Agent, or Firm*—Merchant, Gould, Smith, Edell, Welter & Schmidt

[57] ABSTRACT

A grain distributing auger and leveling member in a grain drying and storage bin having a grain supporting surface underlying the auger and leveling member. A conduit feeds granular material to one end of the auger and a motor and power transmission mechanism imparts material distributing rotation to the auger and pivotal movement to the auger and leveling member about a pivotal support therefor. The leveling member is disposed generally parallel to the auger and in trailing relationship thereto during said pivotal movement, the leveling member being vertically adjustable at least at one end thereof relative to the auger.

8 Claims, 6 Drawing Figures

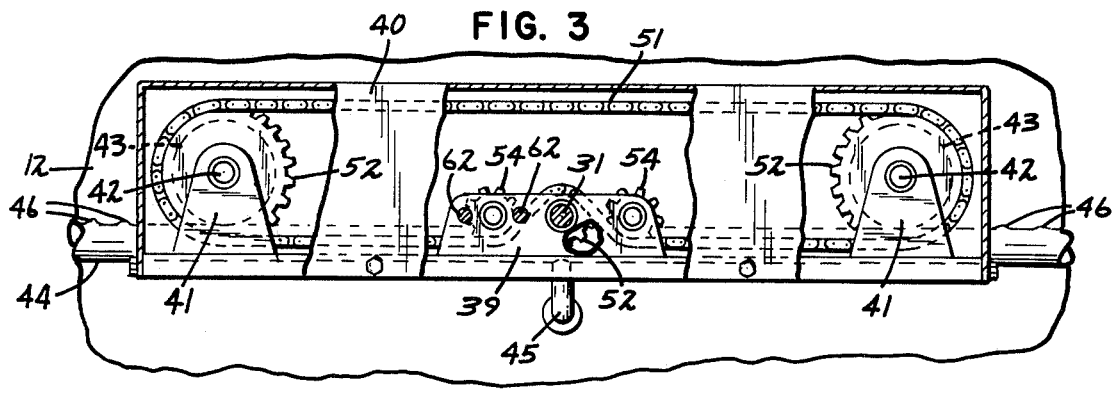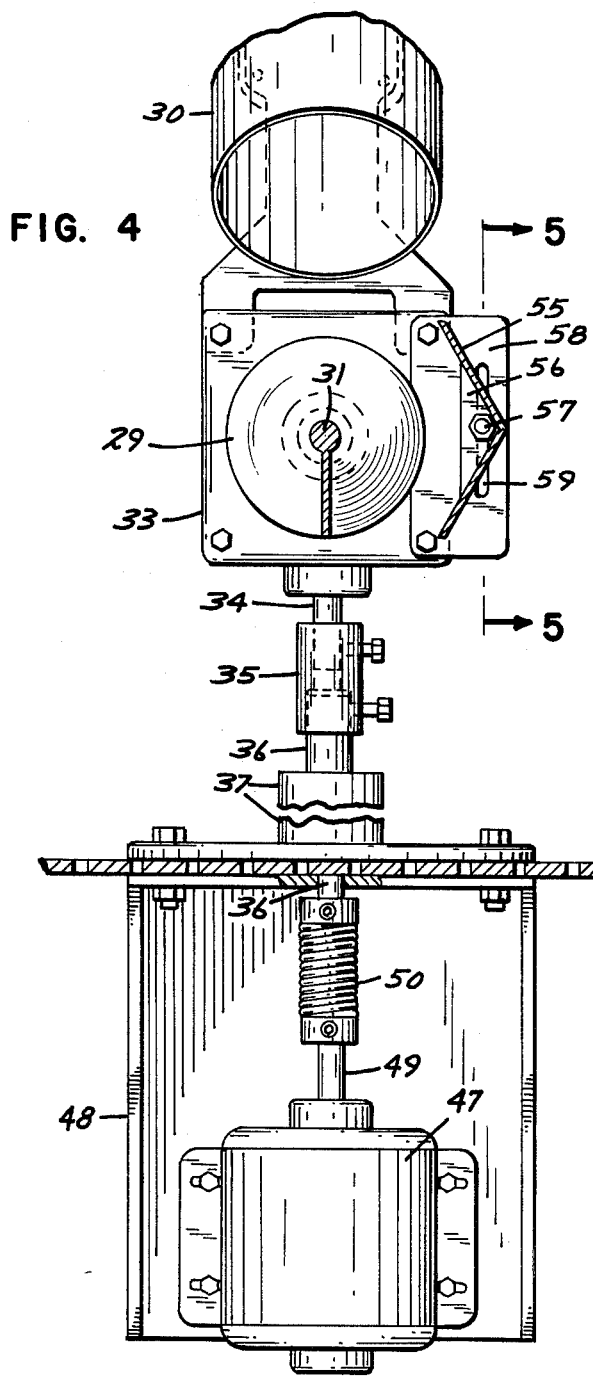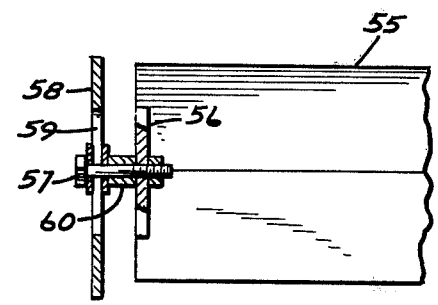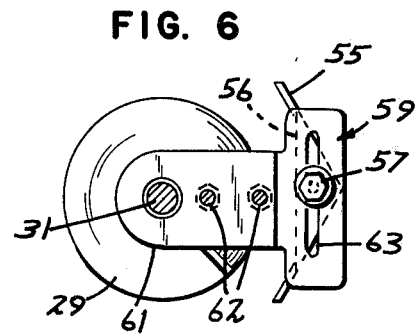

GRAIN DRYING AND STORAGE APPARATUS

This invention relates generally to grain drying and storage apparatus, and is in the nature of an improvement over structure disclosed in my prior U.S. Pat. No. 3,739,926.

I have found that, in a grain drying apparatus wherein warm, dry air is caused to flow upwardly through a layer of granular material such as grain, the grain may dry sooner in a central portion of the layer than at the peripheral portion thereof, or vice versa. Heretofore, difficulty has been experienced in achieving a uniform drying of the material over the entire area thereof without the use of grain stirring mechanism or other means for moving the grain about during the drying operation. I have found that, by adding to the thickness of that portion of the layer which tends to dry earlier, over that portion which takes longer to dry, I have achieved uniform drying of the material over the entire area of the layer thereof.

SUMMARY OF THE INVENTION

The apparatus of the present invention involves an elongated distributing auger having first and second ends, the first end being disposed at the approximate center of the surface over which granular material is distributed to a given depth. Further, the invention involves feeding means for delivering granular material to said surface adjacent said first end of the auger, pivot means for pivotally supporting said auger at said first end, drive means for imparting material distributing rotation to said auger, and means for supporting said auger at said second end thereof. Driving mechanism is included for imparting pivotal movement to said auger about said pivot means. The apparatus further includes an elongated leveler member and support means mounting the leveler member at its opposite end at said first and second ends of the auger and disposing said leveler member in spaced generally parallel trailing relationship to the auger during pivotal movements of the auger, and for raising and lowering of at least one of said opposite ends relative to said auger.

BRIEF DESCRIPTION OF THE DRAWINGS

FIG. 3 is a further enlarged fragmentary section taken substantially on the line 3—3 of FIG. 1;

FIG. 4 is an enlarged fragmentary section taken on the line 4—4 of FIG. 1;

FIG. 5 is a fragmentary section taken generally on the line 5—5 of FIG. 4; and

FIG. 6 is an enlarged fragmentary section taken on the line 6—6 of FIG. 2, and rotated 90 circular degrees.

DESCRIPTION OF THE PREFERRED EMBODIMENT

Figure 1:
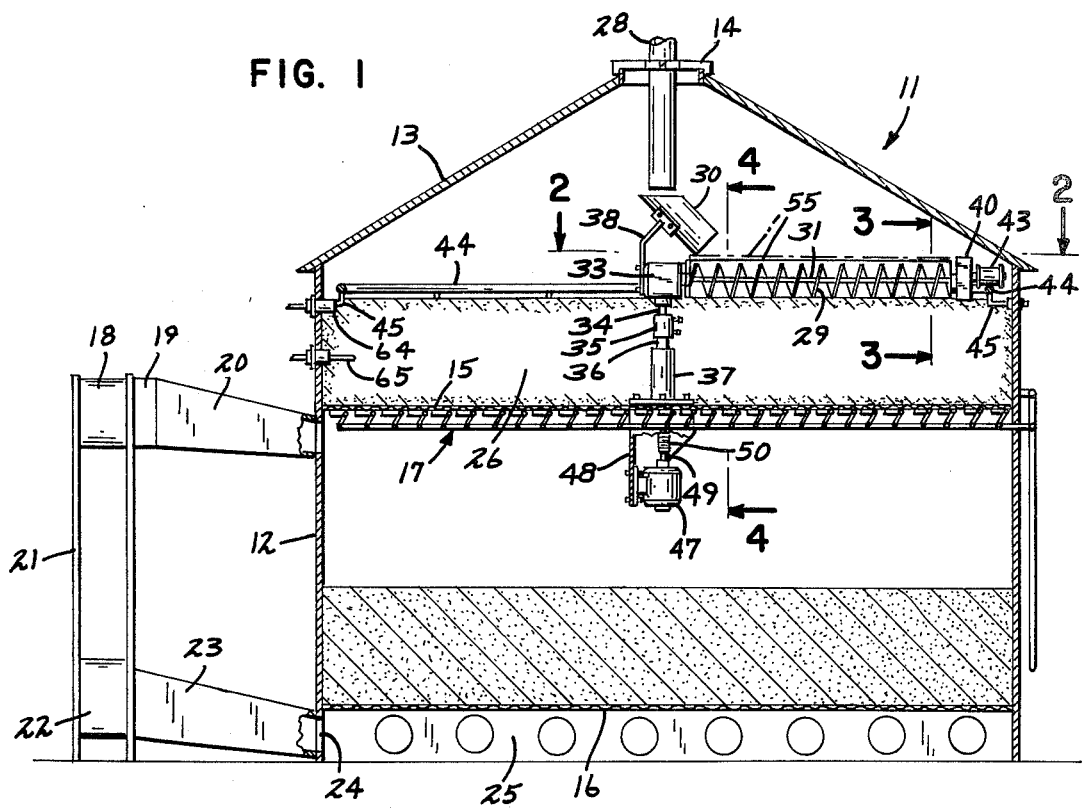
FIG. 1 is a vertical section of a grain drying and storage bin containing the apparatus of this invention.

In FIG. 1, a grain drying and storage apparatus is indicated generally at 11, the same comprising a building structure having a side wall structure 12, and an upwardly tapering roof 13 having a central opening in which is mounted a central support 14. The apparatus further includes an upper floor grid 15 and a lower floor grid 16, the upper floor grid 15 being provided with grain transferring mechanism, indicated generally at 17.

Grain heating apparatus includes a blower 18, a heating unit 19 and a conduit 20 which delivers warm air to the interior of the building just below the upper floor grid 15. The blower 18 and heating unit 19 are supported by a suitable frame 21.

A cooling and ventilating blower 22 is mounted in the frame 21 and delivers cooling air through a conduit 23 and an opening 24 in the side wall structure 12 to a plenum 25 below the lower floor grid 16.

The strucutre above described is more fully disclosed in my prior U.S. Pat. No. 3,739,926 and, in and of itself does not comprise the instant invention. Hence, further detailed drawing and description thereof is believed unnecessary, and is omitted in the interest of brevity. It should suffice to state that control of delivery of a layer 26 of granular material, such as grain, from the upper floor grid 15 to the space there below is controlled by a transferring mechanism control handle exterior of the building.

Grain to be dried and stored is delivered to the interior of the building through a vertically disposed central delivery tube 28 that is suitably supported by the central support 14, the tube 28 terminating at its lower end a distance substantially above the upper floor grid 15. The gain is conducted from the delivery tube 28 to a horizontally disposed auger 29 by means of a conduit 30 having an upper inner end closely underlying the lower end of the delivery tube 28, the conduit 30 sloping downwardly and radially outwardly with respect to the axis of the delivery tube 28.

The auger 29 includes an auger shaft 31 that is coupled to the output shaft 32 of transmission gearing, not shown, but contained within a gear housing or enclosure 33 having an input shaft 34 disposed on the axis of the building. The gear housing 33 is supported from the upper floor grid 15 by means of a rigid coupling element 35 vertically adjustably secured to the input shaft 34, an intermediate shaft 36 aligned with the input shaft 34 and having its upper end vertically adjustably secured to the coupling element 35, and a rigid support bearing 37 mounted on the upper floor grid 15 and journaling the intermediate shaft 36. It will here be noted that the conduit 30 is supported from the gear housing or enclosure 33 by means of a bracket 38. It will be further noted, with reference to FIG. 4, that the inner or first end of the auger 29, together with the gear housing 33 and conduit 30 may be slightly raised or lowered by moving the shafts 34 and 36 longitudinally with respect to the coupling 35.

The second, or radially outer end of the auger 29 has the shaft 31 thereof journaled in plate-like bearings 39 contained within a transmission housing 40 that extends transversely of the auger 29 and which has spaced bearings 41 at the opposite end portions thereof each pair of bearings 41 journalling a different one of a pair of parallel shafts 42 on which are mounted drive rolls 43. The drive rolls 43 having overlying driving engagement with a circular track 44 that is radially inwardly spaced from the circular sidewall structure 12 and is supported therefrom by circumferentially spaced support brackets 45. The track 44 may be made from any suitable material, but I have found it advantageous to fabricate the same from commerically available reinforcing rod used in the building of concrete structures. Usually, reinforcing rod is formed to provide longitudinally sapced transverse ridges 46 thereon, so as to proide traction for the drive rolls 43 which are preferably covered with rubber or similar traction material.

With reference to FIG. 4, it will be seen that the ower or discharge end of the grain delivery conduit 30 directly overlies the radially inner or first end of the auger 29, so that the initial portion of a batch of grain to be dried falls through the inner end portion of the auger 29 to the upper floor grid 15 adjacent the central portion thereof. As the granular material or grain 26 accumulates to the level of the lowermost portion of the auger 29, rotation of the auger 29 in a given direction will move the grain radially outwardly so as to cause the layer of grain 26 to be of substantially uniform thickness over its entire area. Means for imparting rotation to the auger 29 and pivotal movement thereto about the axis of the shafts 34 and 36 comprises a motor 47 that is mounted in a bracket 48 suspended from the central portion of the upper floor grid 15. The intermediate shaft 36 extends downwardly through a central opening in the upper floor grid 15 and is connected to the drive shaft 49 of the motor 47 by means of a flexible coupling 50. Preferably, the motor operates to rotate the auger shaft 31 and auger 29 thereon in a clockwise direction with respect to FIG. 3 and a counterclockwise direction with respect to FIG. 6 for a purpose which will hereinafter become apparent.

Driving rotation is imparted to the drive rolls 43 in the same direction as the auger 29 by power transmission connections within the transmission housing 40. An endless drive chain 51 is entrained over a drive sprocket wheel 52 and mounted on the outer or second end of the auger shaft 31 between the bearing plates 39, and over a pair of sprocket wheels 52 each mounted on a different one of the shafts 42 between its respective bearings 41. A pair of idler sprocket wheels 54 are journalled between the bearing plates 39 at opposite sides of the sprocket wheel 52 to provide for effective engagement of the chain 51 over the drive sprocket wheel 52, see FIG. 3.

It will be noted that the drive sprocket wheel 52 is of substantially smaller diameter than the sprocket wheels 53, so that the drive rolls 43 rotate at a lower speed than that of the auger 29. Thus, the drive wheels 43 impart pivotal movement to the auger 29 at a given rate of speed during filling of the portion of the bin above the upper floor grid 15 and tending to retard acceleration of the pivotal movement due to rolling engagement of the grain by the auger 29 as the layer thereof reaches the level of the lowermost portion of the auger 29.

Figure 2:
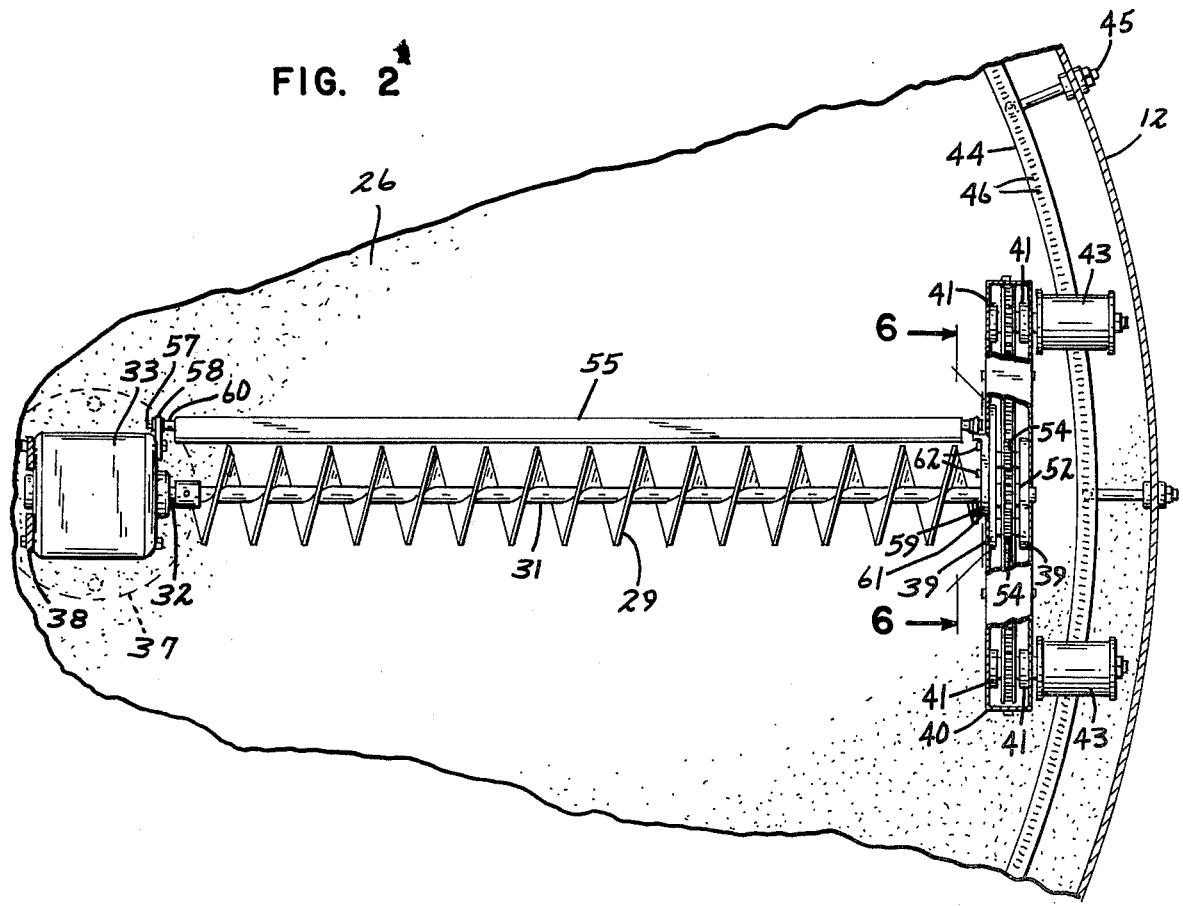
FIG. 2 is an enlarged fragmentary horizontal section taken substantially on the line 2—2 of FIG. 1, some parts being broken away.

With reference to FIGS. 2, 4 and 6, it will be seen that the auger 29 is disposed completely in the open, having no tube there around. The direction and pitch of the helex of the auger 29 is such that, during rotation thereof, the granular material engaged thereby is moved radially outwardly with respect to the center of the building toward the circular or cylindrical side wall structure 12 thereof. For the purpose of aiding the auger in distributing the grain properly, particularly when the level of the layer of grain 26 reaches the lowermost part of the auger 29, I provide an elongated leveling member 55 that is disposed in generally parallel relationship to the auger and spaced therefrom rearwardly of the direction of pivotal movement of the auger 29. The leveling member 55 extends longitudinally from the inner to the outer ends of the auger, and, in the embodiment illustrated, is of cross-sectionally shallow Vee shape. At its opposite ends, the leveling member is provided with flanges 56 which contain nut-equipped anchoring screws 57 that cooperate with mounting elements 58 and 59 at opposite ends of the leveling member 55 to anchor the same in place in rearwardly spaced relation to the auger 29. The mounting element 58 is a generally rectangular metallic plate that is bolted or otherwise rigidly secured to the gear housing 33, and is formed to provide a vertically extended slot 59 for reception of the adjacent one of the anchoring screws 57. With reference to FIG. 5, it will be seen that a washer equipped tubular spacer 60 is interposed between the mounting element 58 and its adjacent flange 56, the anchoring screw 57 extending through the spacer 60. The anchoring element 59 is also generally plate-like in form, and has an end portion 61 that is bored to rotatively receive the outer shaft 31. The element 59 is secured to the transmission housing 40 by a pair of mounting screws 62, see FIG. 6. The mounting element 59 is formed to provide a vertically extending slot 63 for reception of the adjacent anchoring screw 57 which, like the screw 57 at the opposite end is provided with a tubular spacer, similar to the spacer 60 shown in FIG. 5.

During operation of the above-described apparatus, the motor 47 is energized to impart rotation and pivotal movement to the auger 29 and parts associated therewith, as well as the conduit 30, and grain is fed to the conduit 30 through the inlet or delivery conduit 28. The grain falls from the conduit 30 though the first or radially inner end portion of the auger 29 to the top surface of the upper floor grid 15 where, due to pivotal movement of the auger 29 and conduit 30, the grain forms a central circular pile on the upper floor 15. The pile continues to grow until it reaches the level of the lowermost portion of the auger 29 at which time rotation of the auger 29 causes the grain to be spread radially outwardly toward the sidewall structure 12. When the grain reaches the level of the lowermost portion of the auger adjacent the side wall structure 12, a level sensor 64 causes feeding mechanism, not shown, to shut down, and the blower 18 and heating unit 19 to be energized. The feeding mechanism, blower 18, and heating unit 19 are well known, as are the controls therefor, and do not in and of themselves comprise the instant invention.

During the driving operation, it has been found that in some instances with different grains and/or different moisture conditions of the grain, the material of the layer thereof nearer the center of the building dries at a different rate than the material nearer the side wall structure 12. This rate may be faster or slower. I have found that, by changing the elevation of one end of the leveling member 55 relative to the other end thereof, whereby to thicken the layer in the area where the material dries faster, I can obtain substantially uniform drying of the entire layer from the center thereof to the portion adjacent the side wall structure 12. Temperature of the material during the drying operation is indicated by well-known means, not shown, but including a temperature sensor 65.

Changing the tilt of the leveling member 55 is easily and quickly done, by merely loosening one or both of the anchoring screws 57, moving the adjacent end of the leveling member 55 upwardly or downwardly as needed, and thereafter tightening the screw 57.

While I have shown and described a commerical embodiment of my improved grain drying and storage apparatus, it will be understood that the same is capable of modification without departure from the spirt and scope of the invention, as defined in the claims.

What is claimed is:

1. Apparatus for distributing granular material to a given depth over a surface of predetermined size, comprising:
   a. an elongated distributing auger having first and second ends, the first end being disposed at the approximate center of said surface;
   b. feeding means for delivering granular material to said surface adjacent said first end of said auger;
   c. pivot means for pivotally supporting said auger at said first end;
   d. drive means for impating material distributing rotation to said auger; l
   e. means for supporting said auger at said second end thereof;
   f. driving mechanism for imparting pivotal movement to said auger about said pivot means;
   g. an elongated leveller member
   h. and support means mounting said leveller member at its opposite ends at said first and said second ends of said auger and disposing said leveller member in spaced generally parallel trailing relationship to said auger during said pivotal movements of the auger, and for raising and lowering of at least one of said opposite ends relative to said auger.

2. The apparatus defined in claim 1 in which said pivot means comprises a bearing mounted on said surface and a vertical drive shaft journaled in said bearing, said drive means comprising a drive motor and transmission gearing operatively coupled to said drive shaft and said auger.

3. The apparatus defined in claim 2 in which said feeding means comprises a feeding conduit overlying said transmission gearing and mounted for pivotal movement with said auger, said feeding conduit having an upper inner material receiving end disposed generally on the axis of said pivotal movement, said conduit sloping downwardly and readially outwardly of said axis and having a discharge end overlying said auger adjacent said first end of the auger.

4. The apparatus defined in claim 2 in which said means for supporting said auger at said second end thereof comprises a circular track mounted in upwardly spaced relation to said surface and coaxial with said drive shaft, said driving mechanism comprising a pair of laterally spaced rotary shafts, a pair of drive rolls fixed on said shafts and disposed in overlying engagement with said track, means journaling the second end of said auger, and rotary transmission mechanism including sprocket wheels on said auger and said rotary shafts and drive chains entrained over said sprocket wheels.

5. The apparatus defined in claim 4, characterized by a housing enclosing said sprocket wheels and chains, said rotary shafts being journaled in said housing.

6. The apparatus defined in claim 1 in which said support means comprises a support element disposed above said surface adjacent said first end of the auger, a mounting element on an end of said leveller member adjacent said first end of the auger, one of said elements having a generally vertically extending slot therein, an anchoring member secured to the other one of said elements and extending through said slot, and means for releasably securing said anchoring member in desired set positions longitudinally of said slot.

7. The apparatus defined in claim 1 in which said support means comprises a support element at said second end of said auger, and an anchoring connection between said support element and the end of said leveller element adjacent said second end for anchoring the adjacent end of the leveller element at desired set elevations relative to said second end of the auger.

8. The apparatus defined in claim 2 characterized by an enclosure for said transmission gearing, said support means comprising a cirst support element on said enclosure, a second support element on said second end of said auger, and anchoring connections between the opposite ends of said leveller member and respective ones of said support elements and movable in generally vertical direction to releasably lock said opposite ends of the leveller member in desired set elevations relative to their respective ends of said auger.

* * * * *

UNITED STATES PATENT AND TRADEMARK OFFICE
CERTIFICATE OF CORRECTION

PATENT NO. : 4,033,466
DATED : July 5, 1977
INVENTOR(S) : Harlan J. Easton

It is certified that error appears in the above-identified patent and that said Letters Patent are hereby corrected as shown below:

Column 2, line 12, the word "strucutre" should be changed to --structure--.

Column 2, line 68, the word "sapced" should be changed to --spaced--.

Column 3, line 1, "ide" should be changed to --vide--.

Column 3, line 2, the word "overed" should be changed to --covered--.

Column 3, line 4, the word "ower" should be changed to --lower--.

Column 3, line 5, the word "irectly" should be changed to --directly--.

Column 3, line 6, the word "uger" should be changed to --auger--.

Column 3, line 7, the letter "o" should be changed to the word --to--.

Column 3, line 8, the word "uger" should be changed to --auger--.

Column 3, line 9, the word "ortion" should be changed to --portion--.

UNITED STATES PATENT AND TRADEMARK OFFICE
CERTIFICATE OF CORRECTION

PATENT NO. : 4,033,466

DATED : July 5, 1977

INVENTOR(S) : Harlan J. Easton

It is certified that error appears in the above-identified patent and that said Letters Patent are hereby corrected as shown below:

Column 3, line 10, the word "ccumulates" should be changed to --accumulates--.

Column 3, line 11, the word "he" should be changed to --the--.

Column 3, line 12, letters "ion" should be changed to --tion--.

Column 3, line 13, the word "ause" should be changed to --cause--.

Column 3, line 13 and 14, the word "uniorm" should be changed to --uniform--.

Column 3, line 15, the word "otation" should be changed to --rotation--.

Column 3, line 16, the word "bout" should be changed to --about--.

Column 3, line 17, the word "otor" should be changed to --motor--.

Column 3, line 18, the letters "om" should be changed to the word --from--.

Column 3, line 19, the word "termediate" should be changed to --intermediate--.

Column 3, line 20, the word "entral" should be changed to --central--.

UNITED STATES PATENT AND TRADEMARK OFFICE
CERTIFICATE OF CORRECTION

PATENT NO. : 4,033,466
DATED : July 5, 1977
INVENTOR(S) : Harlan J. Easton

It is certified that error appears in the above-identified patent and that said Letters Patent are hereby corrected as shown below:

Column 3, lines 20 and 21, the word "conected" should be changed to --connected--.

Column 3, line 22, the letter "f" should be changed to the word --of--.

Column 3, lines 22 and 23, the word "opertes" should be changed to --operates--.

Column 3, line 24, the first word of this line should be --in--.

Column 3, line 25, the word "ounterclockwise" should be changed to --counterclockwise--.

Column 3, line 26, the word "urpose" should be changed to --purpose--.

Column 3, line 28, the letters "he" should be changed to the word --the--.

Column 3, lines 28 and 29, the word "transmision" should be changed to --transmission--.

Column 3, line 30, the letter "n" should be changed to the word --An--.

Column 3, line 31, the word "procket" should be changed to --sprocket--.

Column 3, line 32, the letters "nd" should be changed to the word --end--.

UNITED STATES PATENT AND TRADEMARK OFFICE
CERTIFICATE OF CORRECTION

PATENT NO. : 4,033,466

DATED : July 5, 1977

INVENTOR(S) : Harlan J. Easton

It is certified that error appears in the above-identified patent and that said Letters Patent are hereby corrected as shown below:

Column 3, line 33, the numeral "9" should be changed to the numeral --39--.

Column 3, line 34, the word "ounted" should be changed to --mounted--.

Column 3, line 35, the word "espective" should be changed to --respective--.

Column 3, line 36, the numeral "4" should be changed to the numeral --54--.

Column 3, line 37, the word "pposite" should be changed to --opposite--.

Column 3, line 38, the word "ffective" should be changed to --effective--.

Column 3, line 39, the word "procket" should be changed to --sprocket--.

Column 3, line 41, the word "ubstantially" should be changed to --substantially--.

Column 3, line 42, the numeral "3" should be changed to the numeral --53--.

Column 3, line 43, the word "an" should be changed to --than--.

Column 3, line 44, the word "mpart" should be changed to --impart--.

UNITED STATES PATENT AND TRADEMARK OFFICE
CERTIFICATE OF CORRECTION

PATENT NO. : 4,033,466

DATED : July 5, 1977

INVENTOR(S) : Harlan J. Easton

It is certified that error appears in the above-identified patent and that said Letters Patent are hereby corrected as shown below:

Column 3, line 45, the letter "f" should be changed to the word --of--.

Column 3, line 46, the letter "e" should be changed to the word --the--.

Column 3, lines 46 and 47, the word "acceleraon" should be changed to --acceleration--.

Column 3, line 48, the letter "f" should be changed to the word --of--.

Column 3, line 49, the letter "e" should be changed to the word --the--.

Column 3, line 51, the word "at" should be changed to --that--.

Column 3, line 52, the word "aving" should be changed to --having--.

Column 3, line 53, the letter "e" should be changed to the word --the--.

Column 3, line 54, the word "ereof" should be changed to --thereof--.

Column 3, line 55, the word "oved" should be changed to --moved--.

Column 3, line 56, the letter "e" should be changed to the word --the--.

UNITED STATES PATENT AND TRADEMARK OFFICE
CERTIFICATE OF CORRECTION

PATENT NO. : 4,033,466

DATED : July 5, 1977

INVENTOR(S) : Harlan J. Easton

It is certified that error appears in the above—identified patent and that said Letters Patent are hereby corrected as shown below:

Column 3, line 57, the word "ructure" should be changed to --structure--.

Column 3, line 58, the word "uger" should be changed to --auger--.

Column 3, line 59, the word "hen" should be changed to --when--.

Column 3, line 60, the word "owermost" should be changed to --lowermost--.

Column 3, line 61, the word "veling" should be changed to --leveling--.

Column 3, lines 61 and 62, the word "parall" should be changed to --parallel--.

Column 3, lines 62 and 63, the word "rearardly" should be changed to --rearwardly--.

Column 3, line 64, the word "uger" should be changed to --auger--.

Column 3, lines 64 and 65, the word "longitudially" should be changed to --longitudinally--.

Column 3, line 66, before the word "the" insert the word --in--.

Column 3, line 67, the word "allow" should be changed to --shallow--.

UNITED STATES PATENT AND TRADEMARK OFFICE
CERTIFICATE OF CORRECTION

PATENT NO. : 4,033,466

DATED : July 5, 1977

INVENTOR(S) : Harlan J. Easton

It is certified that error appears in the above-identified patent and that said Letters Patent are hereby corrected as shown below:

Column 3, line 68, the word "ember" should be changed to --member--.

Column 5, line 15, delete the numeral "1".

Signed and Sealed this

First Day of November 1977

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 4,033,466  Dated July 5, 1977

Inventor(s) Harlan J. Easton

It is certified that error appears in the above-identified patent and that said Letters Patent are hereby corrected as shown below:

Column 2, line 27, "gain" should read -- grain --.

Column 5, line 14, "impating" should read -- imparting --.

Column 6, line 35, "cirst" should read -- first --.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*